Oct. 31, 1939.   E. J. SWEETLAND   2,178,315
REGULATING MEANS FOR VEHICLE PARKING
Filed March 5, 1935   7 Sheets-Sheet 1

INVENTOR
Ernest J Sweetland

Oct. 31, 1939.  E. J. SWEETLAND  2,178,315
REGULATING MEANS FOR VEHICLE PARKING
Filed March 5, 1935  7 Sheets-Sheet 2
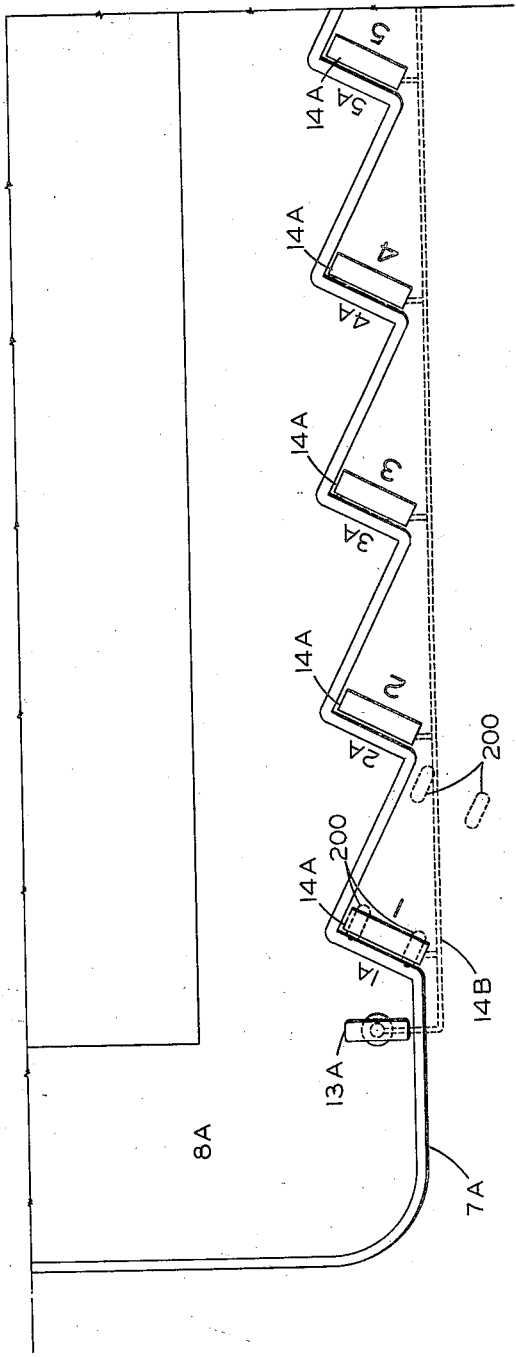
FIG. IA
INVENTOR
Ernest J Sweetland Oct. 31, 1939.   E. J. SWEETLAND   2,178,315
REGULATING MEANS FOR VEHICLE PARKING
Filed March 5, 1935   7 Sheets-Sheet 3
FIG. 2
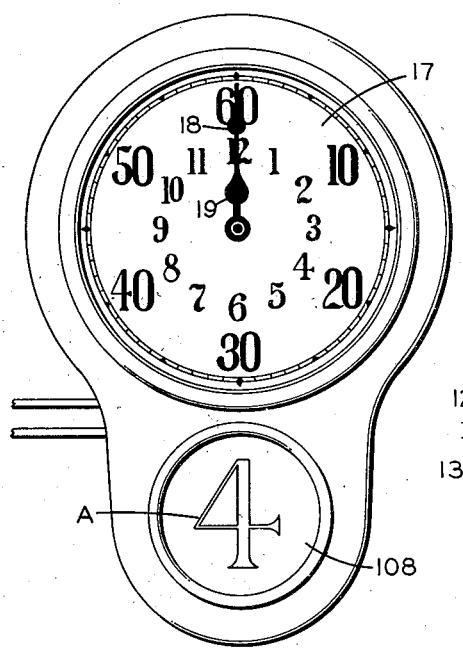
FIG. 3
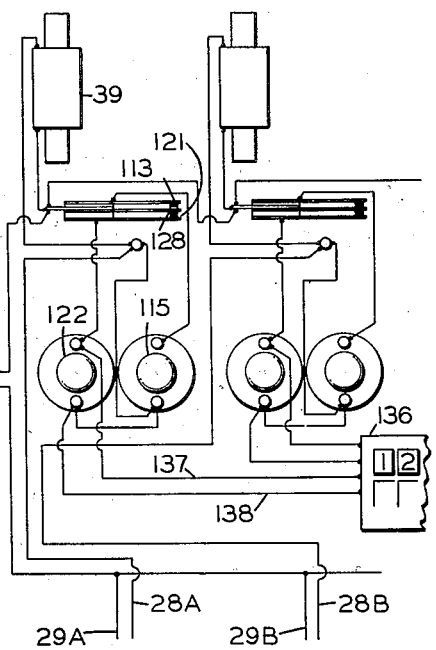
FIG. 5
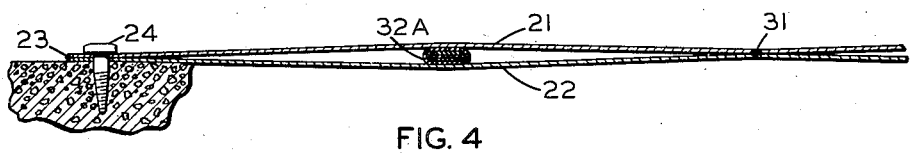
FIG. 4
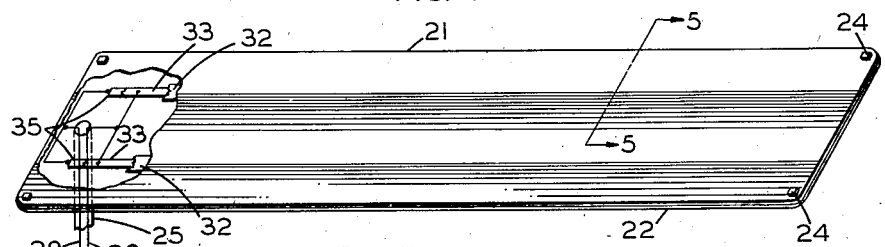
FIG. 6
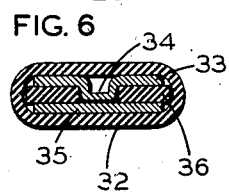
FIG. 7
INVENTOR
Ernest J Sweetland Oct. 31, 1939.  E. J. SWEETLAND  2,178,315
REGULATING MEANS FOR VEHICLE PARKING
Filed March 5, 1935   7 Sheets-Sheet 4

INVENTOR
Ernest J Sweetland

Oct. 31, 1939.　　　E. J. SWEETLAND　　　2,178,315
REGULATING MEANS FOR VEHICLE PARKING
Filed March 5, 1935　　　7 Sheets-Sheet 5

INVENTOR

Oct. 31, 1939.  E. J. SWEETLAND  2,178,315

REGULATING MEANS FOR VEHICLE PARKING

Filed March 5, 1935  7 Sheets-Sheet 6

INVENTOR
Ernest J. Sweetland

Oct. 31, 1939.   E. J. SWEETLAND   2,178,315
REGULATING MEANS FOR VEHICLE PARKING
Filed March 5, 1935   7 Sheets-Sheet 7

INVENTOR
Ernest J. Sweetland

Patented Oct. 31, 1939

2,178,315

UNITED STATES PATENT OFFICE 2,178,315

REGULATING MEANS FOR VEHICLE PARKING

Ernest J. Sweetland, Piedmont, Calif.

Application March 5, 1935, Serial No. 9,391

23 Claims. (Cl. 177—311)

This invention relates to regulating means for vehicle parking and more particularly to means for indicating the length of time automobiles or other vehicles are parked on a city street or in a parking lot or elsewhere. The invention includes not only means of indicating the length of time a vehicle has been parked in a given spot but is provided with means of giving a visual or audible signal when the legal parking limit of time has been reached or exceeded.

The invention further provides means of dividing the curb of a city street into various parking spaces each one of which has a designating mark which corresponds with a similar mark either on an adjacent or a remote timing and annunciating mechanism.

A further object is to provide a clock mechanism with switching means whereby a lamp is caused to light when the timing mechanism is set in operation and a second lamp preferably of different color which is caused to light after the timing mechanism has been in operation for a certain predetermined period.

A further object of the invention is to provide a motor for operating a clock mechanism wherein the field magnet associated with said motor is also utilized as means for placing the hands of the clock mechanism in operation when the current is turned on and releasing the hands so that they may be returned to their former position by the aid of a mechanism to be described in detail herein, when the current which operates the clock mechanism is turned off.

A further object is to provide a clock mechanism with visual signals associated with the clock and connections associated therewith whereby the signals may be duplicated in connection with an annunciator or other device remote from said clock.

A further object is to provide an annunciator which gives a signal, but not at the time the annunciator circuit is closed, but at a pre-determined time interval thereafter.

A further object is to provide a mechanism herein referred to as a mat which is adapted for installation in parking places and is capable of closing a circuit to place a clock mechanism associated with said mat in operation.

A further object of the invention is to provide a clock or time measuring mechanism with a dial of special design whereby the elapsed time during which the mechanism has been in operation can be read from a considerable distance and at the same time provide a dial not likely to be mistaken for an ordinary clock.

Further uses and objects of the invention will be obvious from the following description and the accompanying drawings wherein:

Figure 1A is a modified form of the invention wherein the curb is notched to permit orderly diagonal parking and to control the size of each parking space.

Figure 2 shows a front elevation of a clock dial and casing.

Figure 3 shows a wiring diagram of the clock mechanism, and also shows wiring to a remote annunciator board.

Figure 4 is a perspective view of a mat with a portion broken away to show the interior wiring.

Figure 5 is an enlarged sectional view taken on the line 5—5 of Figure 4 and shows a portion of the mat used for making contact in a parking space.

Figure 6 is a sectional view in detail of a contact strip such as is used in the mat shown in Figures 4 and 5.

Figure 7 is a fragmentary view of the elastic strip used to separate the metallic terminal strips illustrated in Figure 6.

Figure 1:
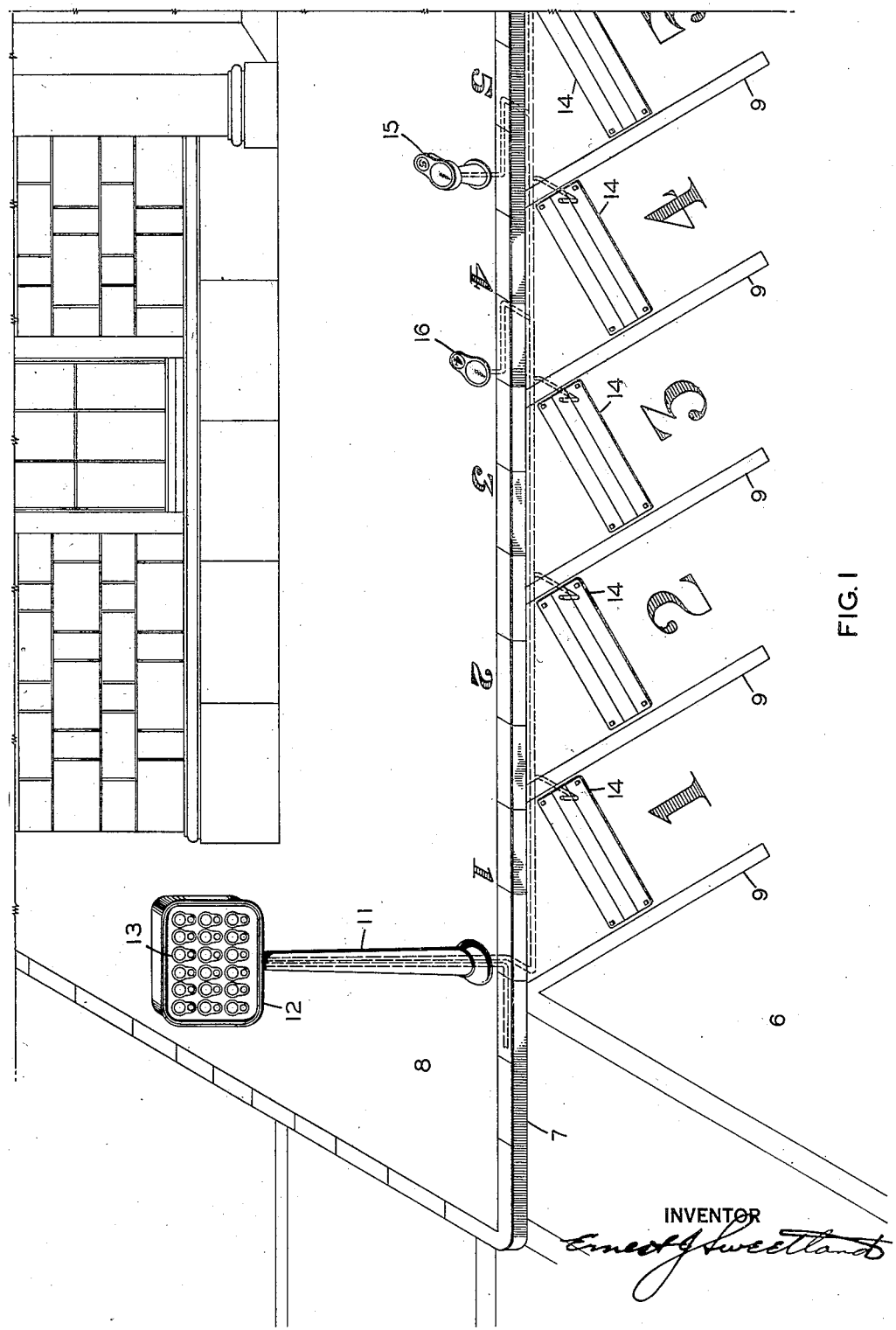
Figure 1 represents a portion of a city street including the sidewalk and curb, a portion of the street being divided into parking places each of which has connection with an indicating panel provided with clock mechanisms corresponding to said parking places.

Referring to the drawings in detail and particularly to Figure 1, the numeral 6 represents a portion of a city street, 7 a curb, and 8 a sidewalk. In Figure 1 the street is marked off with lines 9 which divide the space adjacent the curbing into the divisions indicated by the large numerals 1, 2, 3, 4, and 5 which in practice would be marked on the street and would be duplicated by the smaller numerals 1 to 5 inclusive indicated along the curb. These numerals marked on the curb and street clearly designate parking berths or spaces and each numeral corresponds with a numeral on the clock or annunciator, (or both) which is electrically connected with each space. Such a numeral is shown in Fig. 2 where the large 4 designated by the letter A is shown in the lower dial of the clock.

Returning to Figure 1, 11 represents a standard similar to those ordinarily employed in lamp posts and the like at the top of which is mounted a panel or annunciator board 12. Disposed upon the panel board are a number of clock mechanisms such as 13, each of which is similar to the one illustrated in Fig. 2 and other detail views of the drawings but in this view the scale is too small to permit illustrating the details. Each one of the clocks 13 connects with one of the numbered parking berths or spaces by means of the contact mats 14 which are described in detail further on, and each clock 13 is provided with a number corresponding with the number of the parking berth or space to which it is connected as indicated by the numerals in the spaces and on the sidewalk, the duplicate numbers being placed on the curb or sidewalk because the large numbers in the street are concealed when cars are parked over them.

In a modified form of the invention the clocks pertaining to each parking space may be mounted on the curb instead of having the clocks grouped together as they are in the panel board 12. One form of this modification is designated by the numeral 15 where a post carrying a clock similar to the one illustrated in Figure 2 is mounted in the edge of the sidewalk opposite the parking space.

A further modification is indicated by the numeral 16 wherein a clock is set flush with the sidewalk, the dial being covered with heavy glass.

Referring to Figure 1A the sidewalk 8A is provided with diagonal notches 1A, 2A, 3A etc. Curb 7A follows the contour of the notches, it being assumed that the curbs and sidewalks would be some 6 or 8 inches higher than the level of the street and parking spaces. Each of these spaces has a mat 14A as was also the case in Figure 1 and each mat is connected by means of the conduit 14B which leads to the panel or annunciator board 13A. In the parking space indicated by the numeral 1A a set of automobile wheels 200 are dotted in to show the relative position of a set of wheels with relation to the mat and the parking space. The notches are so proportioned that each vehicle may enter the space or back out without interfering with the one in the adjacent space. In all respects other than the notching of the curb and street line the operation of Figure 1A is similar to that of Fig. 1.

Referring to Figure 2, I prefer to construct the clock with a dial as indicated by the numeral 17 wherein the long hand 18 indicates minutes in accordance with the outer scale of the dial and the short hand 19 indicates hours in accordance with the figures on the inner scale of the dial. This dial construction is easily read from a considerable distance and has the further advantage that the clock is not mistaken for an ordinary time piece.

As will be understood from details to follow, the clock hands always return to their vertical position as shown in Fig. 2 immediately when the clock circuit is broken. Therefore by providing means for closing the circuit of the clock mechanism when the vehicle moves into a parking space, the length of time which the vehicle has occupied the parking space is clearly indicated by the position of the hands of the clock connected to any given parking space.

While it is within the province of my invention to provide any suitable means for making electrical contact when a vehicle moves into a parking place, I have illustrated one means of carrying out this object which will be understood by reference to Figs. 4 to 7 inclusive.

In Figure 4 the numeral 21 designates the upper plate of the mat which is secured to the lower plate 22 preferably by having two plates welded together at their edges as indicated at 23 of Figure 5. The plate is secured to the ground by means of lag screws 24 and is so constructed that moisture is excluded from the interior of the mat even though it may be submerged in water. This is accomplished by means of the welding 23 around the edges, and by the conduit 25, which carries the wires to the mat, being welded or otherwise sealed to the lower side of the mat. Inside of the mat are located a plurality of pairs of contact strips 33 and 35 the construction of which will be understood by the description with reference to Figures 6 and 7 further on. Electric wire 28 is connected to the upper bar 33 of the contact strips and the wire 29 is connected to the lower bar 35 of said strips. (See Figs. 4 and 6.)

Figure 5 clearly shows the plates 21 and 22 and represents a contact strip diagrammatically, as a whole, designated by numeral 32A between the two plates.

These plates may be of any desired size or shape and may be provided with any desired number of contact strips. The plates are preferably made of steel about 1/16th of an inch in thickness and they may be spot welded together at intervals as indicated at 31 which prevents the contact strips from shifting their position.

Referring to Figure 6 which shows a detail sectional view of a contact strip, 32 represents a casing which I prefer to make from soft rubber tubing. Within the casing is a metallic bar 33 which is provided with a series of embossed or extruded projections 34 which are used for making electrical contact with the lower bar 35. The lower bar 35 may be of any suitable metal and may be a straight rectangular bar as indicated. Between the upper bar 33 and the lower bar 35 is a rubber strip 36 which is of a thickness somewhat greater than the height of the extruded contact buttons 34 so that normally the upper and lower bars are maintained in spaced relation to each other without electrical contact between the two. However, when a substantial weight is applied to the upper plate 21 of the mat, rubber strip 36 is compressed allowing the two bars to contact each other thus completing the circuit between the wires 28 and 29.

Figure 7 shows a view of the rubber strip 36 wherein the holes 37 are provided to receive the contact buttons 34 of the upper strip. The object of providing a plurality of contact strips within the mats is to insure that contact is made in one or more of the strips when a vehicle runs on to the mat and the necessity of having the vehicle accurately placed in position is thus avoided.

Figure 8:
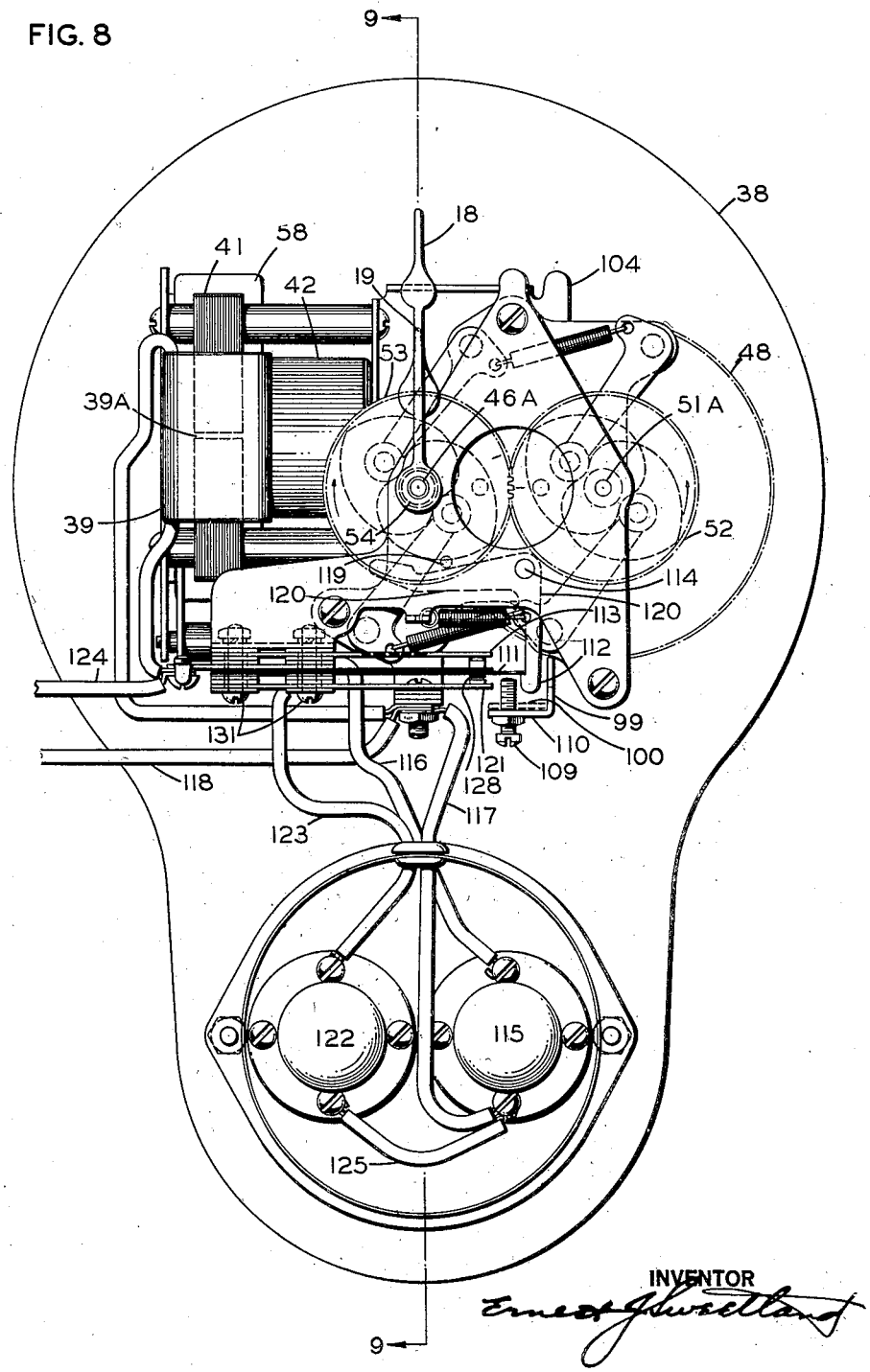
Figure 8 is a front elevation of the interior of the clock mechanism and the attendant signal lights.

Referring to Figure 8 which shows a front elevation of the clock mechanism, the line 38 merely represents an outline of the general form of the clock casing. In this figure the numeral 39 represents the coil which energizes the field magnet 41, and 42 represents the housing which encloses the gearing and the motor armature of the clock mechanism. Details of the clock motor construction are omitted herein as a Telechron or other suitable synchronous clock motor of similar design may be employed. 18 is the long or minute hand and 19 the hour hand of the clock. These hands are connected with the clock motor by means of clutches and gearing preferably in such manner that the minute hand rotates at the rate of one revolution per hour and the hour hand at the rate of one revolution in 12 hours.

The field magnet 41 is parted in the coil by a slight gap 39A to expedite parting of the armature 57 with the field magnet when the current is interrupted.

Figure 10:
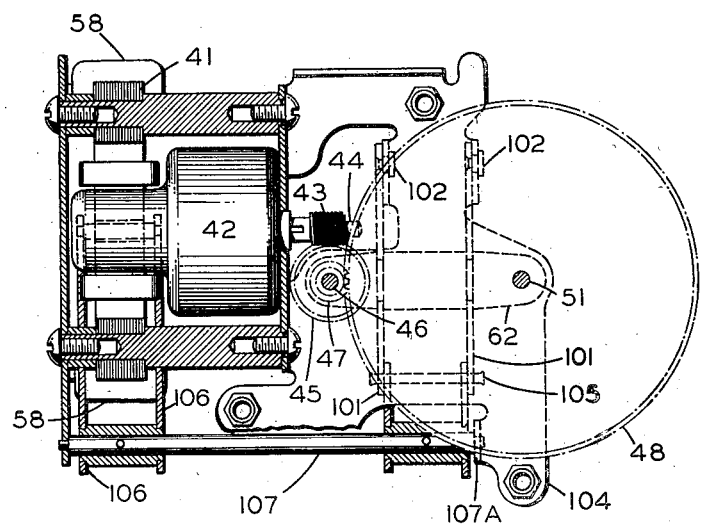
Figure 10 is a plan view partially in section showing the housing of the clock motor and certain of the clock gearing.
Figure 17:
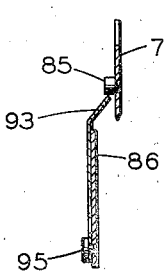
Figure 17 is a sectional view taken on line 17—17 of Figure 16.

The gearing by which the speed of the clock motor drive shaft is reduced will be understood by reference to Figure 10 wherein the worm 43 which is frictionally engaged to the drive shaft 44 (which rotates at the rate of one revolution per minute) engages the worm wheel 45 with a reduction of 60 to 1 thus causing the shaft 46 to rotate at the rate of one revolution per hour. The shaft 46 is provided with pinion 47 which engages the gear 48 with a reduction of 12 to 1 thus causing the shaft 51 to revolve at the rate of one revolution in 12 hours.

Figure 9:
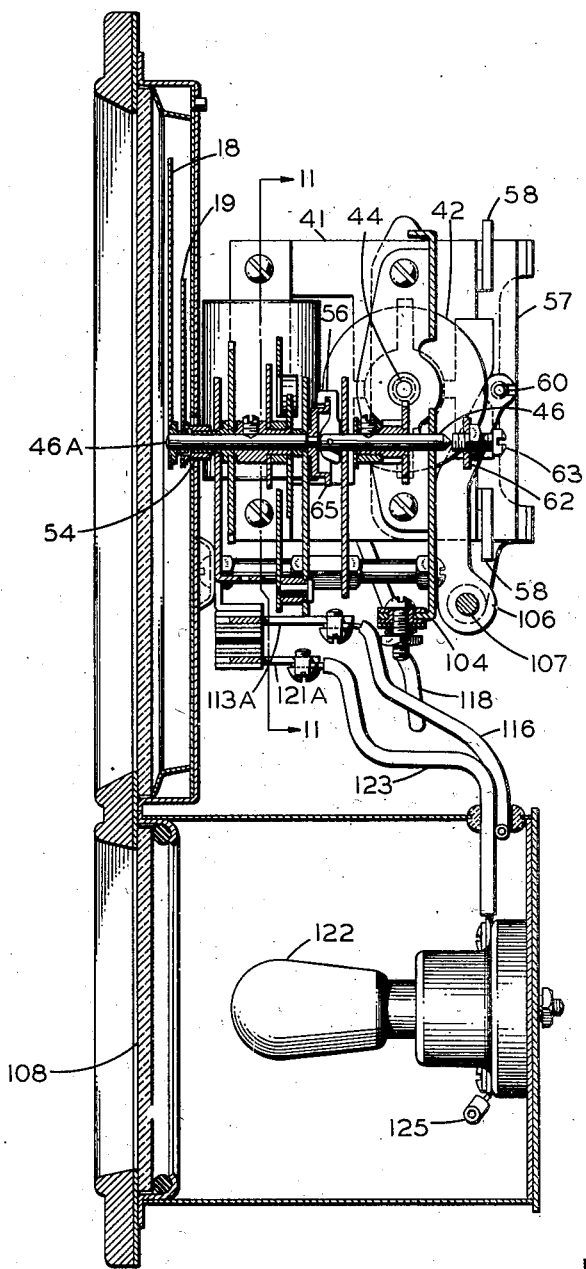
Figure 9 is a side elevation partially in section taken on line 9—9 of Fig. 3, showing the clock mechanism and the attendant signal lights.
Figure 12:
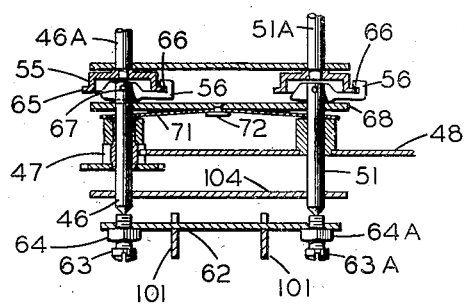
Figure 12 is a fragmentary view of the portion of the clock showing the clutches which operate the hands. These are in engaged position.
Figure 13:
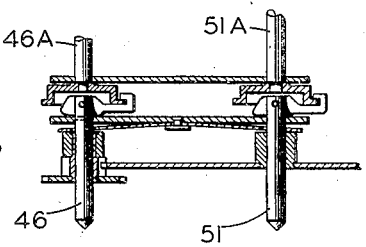
Figure 13 shows the clutches which operate the clock hands in disengaged position.

Referring to Figures 8 and 9 the shafts 46A and 51A are in axial alignment with the shafts 46 and 51 and are operated by the clutch mechanisms shown in Figures 9, 12 and 13. Secured to the shaft 51A is the gear 52 which meshes with the gear 53 which carries a sleeve 54 to which the hour hand 19 is secured. This sleeve 54 is a free running fit around the shaft 46A. (See Figs. 8 and 9.) Therefore the movement of gear 52 is communicated through gear 53 to the hour hand 19. Both hands rotate in clockwise direction.

Referring to Figure 9, it will be noted that the movement of the shaft 46A is brought about only through the clutch shell flange 65 which is engaged by the clutch pawl 56. The elevation of the shaft 46 to cause pawl 56 to engage clutch shell flange 65 is brought about by the armature 57 being drawn into contact with the field magnet 41 of the clock motor the instant the electric circuit to the clock is completed. This armature is provided with shading coils 58 which tend to lessen vibration. The armature 57 is pivoted to the arm 106 by the pin 60. The yoke 62 which carries the adjusting screws 63 is forced forward when armature 57 is drawn to field magnet 41 advancing the shaft 46 by pressure of screw 63 sufficiently to cause the pawl 56 to engage the clutch shell flange 65 and the rotary motion of the shaft 46 is thus imparted to the shaft 46A which carries the minute hand 18. As will be noted, in Figure 12 the yoke 62 carries two screws 63 and 63A, the former functioning in connection with the minute hand and the latter the hour hand. The adjusting screws 63 and 63A are secured in place by the lock nuts 64 and 64A.

A clear understanding of the functions of the clutches for engaging and disengaging the hands of the clock will be obtained by reference to Figures 12 and 13. Figure 12 shows the clutches in engaged position, it being assumed that the clock is in operation and that the shafts 46 and 51 have been pushed upward by the screws 63 and 63A against the pressure of leaf spring 71. As the clutches are identical in operation one only will be described. Fixed to the shaft 46A is the clutch shell 55 which is provided with the outstanding flange 65 the upper and lower surfaces of which are at right angles to the axis of the shaft. The shaft 46 is provided with the pawl 56 which carries a slot 66 which is just wide enough to accommodate the flange 65 with a slight clearance. This pawl is pivoted in a slot of the shaft 46 by the pin 67 and the entire shaft 46 is free to move in its bearing in the plates 68 and 104 in the direction of its longitudinal axis. The leaf spring 71 which is secured to the plate 68 by the rivet 72 normally biases the shafts 46 and 51 downwardly to the disengaged position of the clutch; but when the armature 57 is brought into contact with the field magnet 41 (see Fig. 9) the shafts 46 and 51 are pushed forward against the pressure of the spring 71 and in this position the slot 66 is thrown sufficiently out of alignment with the flange 65 to cause the pawl 56 to grip the flange 65 and thus set the hand connected with shaft 46A in motion. Figure 13 shows the clutches in disengaged position. It will be understood that the clearance between the surfaces of the flange 65 and the slot 66 of the pawl are so slight that an upward movement of a few thousandths of an inch of the shafts 46 and 51 causes the clutch to engage and that they are automatically disengaged by spring 71 immediately when current is discontinued in the field coil of the magnet. From the foregoing it will be understood that when the current is turned through the field magnet coil of the clock, three important functions are simultaneously performed. First, the clock motor is set in motion; second, the magnet armature 57 is drawn to the field magnet thus causing the shafts 46 and 51 to move longitudinally so as to cause pawls 56 to engage the clutch shell flanges and set the hands of the clock in motion; and third, one of the lamps controlled by the clock switch is caused to light. The details of the last named function will be more clearly understood from the description of the switch mechanism within the clock which is hereinafter described.

Immediately when the clock circuit is broken the hands return to the normal vertical position, the clock motor stops and the light goes out.

Figure 11:
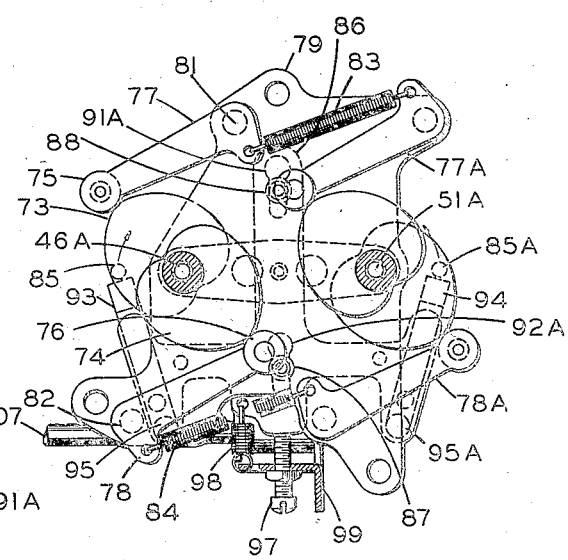
Figure 11 shows the arrangement of heart cams whereby the hands of the clocks are automatically returned to their starting point and it also shows a portion of the mechanism employed to move the heart cams away from dead center when the clock current happens to be turned off when they are in dead center position.
Figure 16:
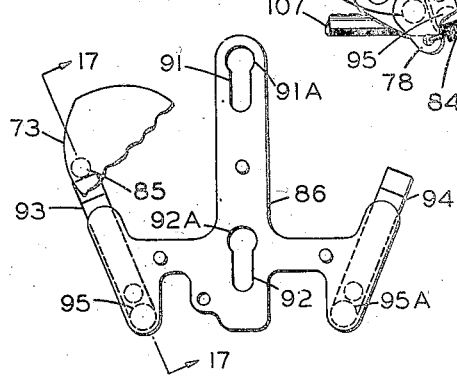
Figure 16 shows the dead center release plate in elevation.

The method of returning the hands to normal position will be understood by reference to Figure 11 which is a partial plan view taken on the line 11—11 of Figure 9. Figure 11 shows the shafts 46A and 51A. Secured to the shaft 46A are a pair of oppositely disposed heart cams 73 and 74. The surfaces of these cams are engaged by rollers 75 and 76 which are pivotally mounted at the ends of the arms 77 and 78. These arms in turn are pivotally secured to the plate 79 by the pivots 81 and 82. Similar cams, rollers, and arms perform similar functions in connection with the shaft 51A. The arm 77 is connected to the arm 77A by means of the tension spring 83 and the arm 78 is connected to the arm 78A by tension spring 84, with the result that the tension springs keep all of the rollers such as 75 in bearing with their respective cam surfaces so that when the shafts 46A and 51A are rotated to move the hands of the clock the rollers follow the surfaces of the cams and maintain a gentle pressure thereon. The functions of these cams and rollers are to return the clock hands to the zero or vertical position whenever the current in the clock is discontinued. In Figure 11 the cams are represented in dead center position and I have found it necessary to provide means of throwing the cams off dead center when the clock happens to be stopped in that position. To accomplish this object the cam 73 is provided with pin 85 and a similar pin 85A is provided on the corresponding cam of shaft 51A. An auxiliary plate 86 (shown in detail in Fig. 16) which I term a dead center release plate is carried by the plate 79. It is slidably held in place by shoulder studs 87 and 88 which secure the release plate in position but permit a sliding motion due to the slotted openings of the release plate as shown at 91 and 92, (Fig. 16). 91A and 92A are holes at the ends of slots to facilitate assembling. A light leaf spring 93 and 94 is carried at either side of the release plate. These are held to the release plate by the rivets 95 and 95A. The release plate 86 travels with the movement of arm 99 as it is held against the adjusting screw 97 by the tension spring 98 which engages the release plate at one end and a portion of the arm 99 at the other as shown in plan in Figure 11 and elevation in Figure 14.

Figure 14:
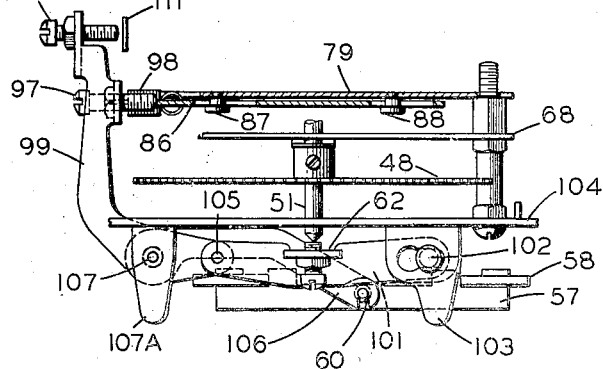
Figure 14 shows the armature which actuates the clutch mechanisms and a portion of the dead center release plate used for moving the heart cams out of dead center position.

The movements of the armature 57 and its effect upon the movements of arm 99 and the dead center release plate will be understood by reference to Figure 14 viewed in conjunction with Figure 11. The arm 99 is securely fixed to the shaft 107 which is free to rotate in the pair of bearings, one of which is shown in the ear 107A, it being understood that lever 99 is continued beyond the shaft 107 and terminates at the pivot 105 to which the link 101 is secured at one end. The other end of 101 is pivoted by the shoulder stud 102. The arm 106 which engages the armature 57 by means of the pin 69 has its opposite end also securely fixed to the shaft 107. Therefore when the armature 57 is drawn to the field magnet 61 (which is shown in Fig. 9 but not shown in Figs. 11 and 14) it raises the lever 106 causing shaft 107 to rotate, giving the arm 99 a slight radial movement, and since the dead center release plate 86 is held against the end of the screw 97 by the spring 98, the release plate always follows the movements of the arm 99. The release plate 86 as viewed in Fig. 11 slides downwardly a small fraction of an inch when the armature 57 is drawn to the magnet and moves upwardly a like distance when the magnet is disengaged. If the heart cams happen to be on dead center when the circuit is broken and the armature leaves the field magnet, then the delicate leaf springs 93 and 94 engage the pins 85 and 85A and push the cams off dead center and the pressure of the rollers such as 75 and 76 bearing on the cam surface return the hands of the clock to their zero or vertical position. The springs 93 and 94 are so very light that if the cams have not quite reached the dead center position the springs do not offer sufficient resistance to interfere with the pins 85 and 85A sliding back under the springs and therefore the cam rollers rotate the cams backwardly until they come to rest in the valleys thereof, and thus the hands are always returned to their vertical position.

From a study of the levers as indicated in Fig. 14 it will be noted that the leverage as applied to the raising of the yoke 62 and attendant parts is compounded in the following manner: The armature 57 through the lever 106 rotates the shaft 107 which through the movement of the pivot 105, which is carried at the lower end of the arm 99, moves the links 101 which are fulcrumed by a shoulder stud 102. This, I have found, provides ample power for elevating shafts 46 and 51 and to engage the clutches associated therewith.

The functions of the clock call preferably for the lower dial 108 of the clock to be illuminated when the clock is set in operation and for the light to change color, say from white to red, when the legal parking limit has been reached. This is accomplished by the switch mechanism which is shown in assembly in Figure 8 and the parts of which are shown in detail in Figure 15.

Referring to Figure 8 the screw 109 is carried by the lug 110 at the upper end of the arm 99. This arm by reason of the spring 71 moves into the position shown by the dotted line 100 when the current is disconnected from the clock motor. This always causes the switch leaf 111 to assume the position shown in Figure 8 whenever the clock is stopped for it forces the leaf 111 which is very thin and of resilient material to pass beyond the latch 112 of the switch trigger 120 which is pivoted at 114. This causes contact to be made with switch terminal 113 which closes the circuit with the white light 115 through the wire 116 which through a connection (not shown) is in electrical communication with the switch terminal 113, the circuit being completed in the white light through the wires 117 and 118. In the gear wheel 53 is mounted a pin 119 the function of which is to trip the trigger 120 and disengage the latch 112 when the legal parking limit has been reached. While this pin is stationarily mounted in the gear wheel 53 the length of time which elapses before the red light 122 is turned on may be varied to suit local conditions by simply shifting the position of the gears 52 and 53 with reference to each other, the gears in this case being so designed that each tooth represents a period of ten minutes. When the pin 119 has advanced far enough to throw the latch 112 out of engagement with the leaf 111 the latter springs back and permits terminal 128 to spring into contact with switch terminal 121 thus breaking the circuit with the white light and completing the circuit with the red light 122 through the wire 123 which by a connection not shown communicates with one of the power lines 124 and through the wires 125, 117, and 118 which completes the circuit.

Figure 15:
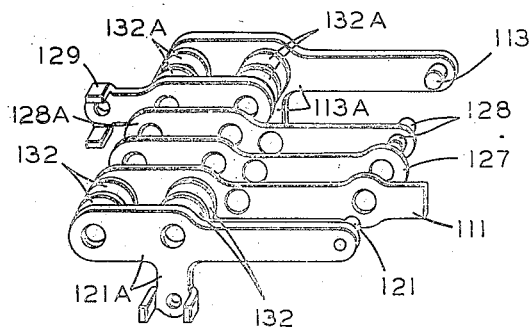
Figure 15 is a perspective view showing the elements of the switch mechanism which controls the lights. In this view the elements are separated to facilitate description.

The switch construction will be more clearly understood by reference to Figure 15 considered in conjunction with Figures 8 and 9. In Figure 15 the switch elements are separated and shown in perspective. In this view 121 represents the red light switch terminal; 111 the leaf which in the completed assembly is acted upon by the latch 112 (Fig. 8). 127 represents a fiber insulation that separates 111 from 128 and 128 is the central switch terminal which through element 129 connects with wire 124. 113 represents the switch terminal which connects with wire 116. In assembling these parts together fiber washers 132A are placed between elements 113A and 129 while the current flows directly from 129 into 128A and 128. The insulating element 127 separates 128A from 111 and insulating washers 132 are used between 111 and 121A. Thus arranged the assembly is clamped together by the screws 131 which are protected from contact with the elements by means of tubular insulation surrounding the screws. It should be understood that the element 128A is made of resilient material which is sprung sufficiently toward the switch terminal 121 that it automatically makes contact with 121 which controls the red light except at such times as it is pressed in the opposite direction by the leaf 111 when it is forced in contact with the terminal 113 which controls the white light.

Referring to the wiring diagram in Figure 3, 124 and 133 represent power lines taken from any source of power. The line 133 has connections 29A and 29B each one of which communicates with a mat in a parking space through wire 29 of the mat shown in Figure 4 and the wires 28A and 28B each connect with wire 28 of the same mats. When a car passes on to the mat and springs the bars 33 and 35 (Fig. 6) into contact with each other a circuit such as 29A to 28A of the wiring diagram is closed thus turning on the current in one of the clocks. When the current enters the clock it passes through the field magnet coil 39 thus starting the movement of the clock hands. At the same time the switch points 113 and 128, which were brought into contact by the dropping of armature 57 and latch 112 when the clock last stopped, causes white lamp 115 to light, and after the permissible time for parking has elapsed the trigger 120 of Figure 8 is released by pin 119, causing the point 121 and 128 to contact and 113 to be disengaged, thereby causing the white light 115 to go out and the red light 122 to be lighted. This diagram, in addition to the clock wiring, represents a remote annunciator 136 which may be employed if desired to operate a remote signal at a central station to indicate when the red light on any particular clock is placed in service. This is accomplished by running a pair of wires such as 137 and 138 from each red light connection to the central station annunciator. The annunciator may have either visual or audible signals or may be provided with both.

The functions of the clock mechanism may be briefly summarized as follows: First, when the clock circuit is closed the clock magnet armature 57 is drawn to the field magnet of the clock causing the clutch members 56 and 65 to engage and the hands to be set in motion and the white lamp 115 to be lighted. Second, when the predetermined legal parking limit has been reached the latch 112 releases the switch leaf 111 causing same to open the circuit between 128 and 113 and to close the circuit between 128 and the terminal 121 thus causing the white lamp to go out and the red lamp 122 to be lighted, while the hands of the clock continue uninterruptedly in their operation. Third, when the vehicle is removed from a mat in any particular parking space the circuit is broken, allowing the armature 57 to be forced away from the field magnet by the spring 71 which disengages the pawls 58 from the clutch flanges 65 when the hands of the clock are returned to the normal or vertical position by the heart cams and rollers previously described; when this action takes place the screw 109 resets the leaf 111 back of the latch 112 thus making the necessary contact for the white light to again be illuminated when the next vehicle takes its place on the mat.

One method of utilizing the invention is as follows: A street section may be divided into parking spaces as indicated in Figure 1 or 1A, the leads from each mat being carried to a separate clock bearing a number corresponding to the parking spaces. Immediately when a car takes its position on one of the mats the white light in the lower dial of the clock is turned on and the hands of the clock start in motion. When the legal limit has been reached, say at the end of 30 minutes, the white light is turned out and the red light in the clock is turned on, so that so long as a red light shows on the clock dial it is apparent to anyone within view of the panel board that a car has occupied the space beyond the legal limit of time. Warning is thus given not only to the traffic officer in charge of the district but to the public that the car is illegally occupying the space and such measures may be taken as are prescribed by the local laws covering parking.

Since red lights can be seen for several blocks it is possible by this means for a single officer to closely supervise parking of vehicles over a comparatively large territory.

If it is desired to do so the panel boards on the streets may be omitted entirely and all of the wires from the mats in the parking spaces may be carried in conduit to a single office or station where a clock mechanism or annunciator is mounted on the wall and suitably numbered to correspond with each parking space in the entire district; by this means hundreds of clocks come under the immediate observation of the officer in charge.

The panel board may be considered a special type of annunciator wherein each unit possesses the novel features of giving a signal (white light) when contact is first made; and of giving a second signal (red light) at the end of a predetermined period of time. At the same time the hands of the clock indicate exactly how much time has elapsed since the contact was first made. If desired, this special form of annunciator may be simplified by omitting the clock dial. In this case the public or officer in charge is not informed of the length of time which each vehicle is parked but is notified by the red signal when a vehicle has overstayed the parking limit.

When used in this manner the instrument may be regarded as a novel type of annunciator the action of which is delayed by a definite measured period of time after the circuit connected with the parking space has been closed, and if the circuit is broken by the vehicle leaving the parking space before the legal predetermined priod of time (legal parking limit) has expired then the annunciator unit automatically resets itself and does not annunciate at all.

It is within the province of my invention to construct the annunciator panel 13 in such a manner that a single timing mechanism controls all of the annunciator elements. In this modification a single timing mechanism is provided with a slowly revolving shaft carrying a plurality of cams each one of which is connected with an annunciator light switch. The cams normally remain stationary on the shaft but each cam has connection to the shaft through a clutch operated by an electro-magnet having connection with the parking space. When contact is made in the parking space the magnetic clutch associated therewith causes the cam to rotate with the shaft causing the red lamp to light at the end of the legal parking limit, a heart cam mechanism being used to cause each cam to return to its neutral position when the vehicle moves away and the circuit is open.

The contact means employed to close the electric circuit and cause the annunciator and timing clocks to operate is subject to many variations without departing from the spirit of my invention. For instance the contact bars 33 and 35 and the rubber strip 36 may be omitted entirely and the tubes 32 may be filled with a fluid such as alcohol or glycerine, in which event a conduit would lead from the fluid-filled tubes to a suitable diaphragm or sylphon switch. Or, the mats such as 14 and 14A may be omitted entirely and replaced with any suitable means of causing contact to be made when a vehicle takes its place in the parking space. For instance, a magnetic needle completely encased and concealed underground or adjacent to the curb line may be associated with an electric switch for making the necessary contact, in which case the fluctuation of the needle, due to the proximity of a car, operates the switch. Or, an electric condenser may be placed under the parking space and connected with an electric circuit. When such an arrangement is provided the capacity of the condenser is influenced by the proximity of a vehicle whereby an electric circuit associated with the condenser gives the necessary signal for placing the annunciator unit in operation. In another modification a magnetic core surrounded by a very fine wire coil may be mounted under the parking space in which case an electric circuit passing through the coil is caused to fluctuate due to the proximity of a vehicle thus causing the necessary signal to be transmitted to the annunciator unit. Photoelectric cells may be employed for indicating the movements of cars into and out of parking spaces, and for operating the timing mechanism switches if desired. In such modifications the customary use of vacuum tubes and kindred apparatus for amplifying delicate signals would be employed in accordance with well known practice.

I have illustrated and described in detail one method whereby the movements of the vehicles in the parking space actuates the clock and annunciator mechanism; but other methods, too numerous to mention may be employed with satisfactory results.

Obviously the form of the clock and of the dial bearing the number of the associated parking space may be varied to suit specific tastes and requirements. For instance the dial 108 may be omitted entirely and the electric lamps arranged to illuminate the main dial of the clock mechanism if desired, the dial being illuminated in white when a vehicle moves into position and the color being changed to red at the end of the legal parking limit.

While I have illustrated a clock having a dial with an hour and minute hand, various other forms of dials may be successfully employed. For instance, the revolving hands may be displaced by a revolving drum bearing numerals which indicate the number of minutes and hours the clock has been in operation.

The annunciator means described may be referred to as a primary and secondary annunciator. The primary annunciator is the signal (white light) which is given when a vehicle moves into the parking space thus indicating that the space bearing the annunciator number is occupied; the secondary annunciator (red light) functions only when the contact has continued until the parking limit has been reached. Since the timing means associated with the annunciator automatically resets when the vehicle is removed from a parking place, it follows that secondary annunciation occurs only in the event the legal limit is exceeded.

In the arrangement described, the timing mechanism, or annunciator, is caused to function by closing of the circuit in the parking space; but obviously the annunciator may be caused to function by opening this circuit if desired. For example, the objects of my invention could be carried out by having one circuit from a power line to operate the timing mechanism, and a secondary circuit (of lower voltage if desired), which connects with the mat or other switch means associated with the parking space. In this event a magnetic switch or clutch may be used for starting and stopping the timing mechanism, and this magnetic switch would be operated by the secondary circuit which connects with the parking space. If this method of operation is employed, it is immaterial so far as the purposes of the invention are concerned, whether the act of bringing the vehicle into the parking space closes the secondary circuit and causes the magnetic switch to start the timing mechanism in motion; or whether the secondary circuit is normally closed and is opened when a vehicle moves into the parking space. Obviously the mechanism can be made to operate satisfactorily by either means depending upon wiring details, and therefore in the following claims when I refer to actuating a means, switch or an electric circuit, I mean causing a change to take place in the system which causes the timing means to be placed in operation, regardless of whether the annunciator apparatus is caused to function by opening or closing the circuit.

From the foregoing description it will be understood that the evil of certain vehicles monopolizing spaces in congested districts may be entirely eliminated. By having a definite, accurate control over parking which is clearly visible to and understood by the public as well as by the traffic officers, merchants will increase the number of patrons visiting their places of business within a given time with a consequent increase in business and enhancement in value of property.

In compliance with the patent statutes, I have illustrated and described certain preferred embodiments of my invention but it is to be understood that various modifications and changes may be made therein and that parts of the invention may be used without others without departing from the spirit of my invention or the scope of the appended claims.

I claim:

1. Means for indicating the period of parking of a vehicle in a parking berth comprising: a clock mechanism including means graduated in units of time for indicating a time interval; means to be associated with a parking berth and actuable by the parking of a vehicle in said berth arranged and constructed so that it is operable to cause said clock mechanism to start when a vehicle parks in said berth said means also being operable to cause said clock mechanism to stop on departure of a vehicle from said berth; and connections between said clock mechanism and said vehicle-actuable means for maintaining said clock mechanism in operation during the entire interval that a vehicle remains parked in said berth.

2. Means for indicating the period of parking of a vehicle in a parking berth comprising: an electrically operated clock mechanism including means graduated in units of time for indicating a time interval; means to be associated with a parking berth and actuable by the parking of a vehicle in said berth arranged and constructed so that it is operable to cause said clock mechanism to start when a vehicle parks in said berth and to cause said clock mechanism to stop as the result of the departure of a vehicle from said berth; connections between said clock mechanism and said vehicle-actuable means for maintaining said clock mechanism in operation during the interval that a vehicle remains parked in said berth; and means operatively connected with said clock mechanism for automatically resetting said indicator means to a predetermined starting position upon stopping of said clock mechanism.

3. Means for indicating the period of parking of a vehicle in a parking berth comprising: a timing mechanism to be operatively arranged relatively to a parking berth, a dial graduated in units of time and indicator means for registering a time interval operatively associated with said timing mechanism; means actuable by the parking of a vehicle in said berth arranged and constructed so that it is operable to cause said timing mechanism to start driving said indicator means when a vehicle parks in said berth and also to interrupt said drive to stop said indicator means following the departure of a vehicle from said berth; connecting means between said timing mechanism and said indicator means for maintaining said indicator means in operation during the entire interval that a vehicle remains parked in said berth; and means operatively connected with said timing mechanism for automatically resetting said indicator means to a predetermined starting position upon interruption of the drive of said indicator means.

4. Means for indicating the period of parking of a vehicle in a parking berth comprising: an electrically operated clock mechanism to be associated with a parking berth, said clock mechanism including graduated means for indicating a time interval; means to be disposed in said parking berth and actuable by the parking of a vehicle in said berth arranged and constructed so that it is operable to cause said clock mechanism to promptly start when a vehicle parks in said berth and to cause said clock mechanism to stop after a vehicle departs from said berth; electrical conductor means connecting said clock mechanism with said vehicle-actuable means for maintaining said clock mechanism in operation during the interval that a vehicle remains parked in said berth; and signal means operatively associated with said clock mechanism and simultaneously actuable with the starting of said clock mechanism to indicate that a vehicle has been parked in said berth.

5. Means for indicating the period of parking of a vehicle in a parking berth comprising, an electrically operated clock mechanism to be operatively arranged relatively to a parking berth, said clock mechanism including means graduated in time units for progressively indicating the lapse of time; switch means to be operatively associated with said parking berth and actuable by the parking of a vehicle in said berth arranged and constructed so that it is operable to cause said clock mechanism to start as the result of the parking of a vehicle in said berth and to cause said clock mechanism to stop as the result of the departure of a vehicle from said berth; wiring connections between said clock mechanism and said vehicle-actuable switch means for maintaining said clock mechanism in operation only during the interval that a vehicle remains parked in said berth; and signal means operable by said clock mechanism at the end of a predetermined period of time for indicating that a vehicle has remained parked in said berth for a period of time longer than said predetermined period.

6. Means for indicating the period of parking of a vehicle in a parking berth comprising, an electrically operated timing mechanism to be operatively arranged relatively to a parking berth, said timing mechanism including a pointer and means graduated in units for indicating time intervals; means actuable by the parking of a vehicle in said berth arranged and constructed so that it is operable to cause said timing mechanism to start driving said pointer when a vehicle parks in said berth and also to interrupt the driving of said pointer after a vehicle departs from said berth; wiring connections between said timing mechanism and said vehicle-actuable means for maintaining said pointer in operation during the interval that a vehicle remains parked in said berth; switch means arranged and constructed so that it is operated by said timing mechanism at the end of a predetermined time interval; and signal means responsive to the actuation of said switch for indicating that a vehicle has remained parked in said berth for a period in excess of said predetermined period of time.

7. Means for indicating the period of parking of a vehicle in a parking berth comprising, an electric clock mechanism to be associated with a parking berth and including a graduated scale and indicator means cooperating with said graduated scale for indicating time intervals; means actuable by the parking of a vehicle in said berth arranged and constructed so that it is operable to start said clock mechanism when a vehicle parks in said berth and to stop said clock mechanism following the departure of a vehicle from said berth; electrical conductor means between said clock mechanism and said vehicle-actuable means for maintaining said clock mechanism in operation during the interval that a vehicle remains parked in said parking berth; a primary signal means and a secondary signal means operatively connected with said clock mechanism, said vehicle-actuable means being operable to simultaneously operate said primary signal means with the starting of said clock mechanism to indicate that a vehicle has been parked in said berth; and a switch mechanism actuable by said clock mechanism at the end of a predetermined period for simultaneously rendering said primary signal means inoperative and actuating said secondary signal means to indicate that a vehicle has remained parked in said parking berth for a period longer than said predetermined period.

8. Means for indicating the period of parking of a vehicle in a parking berth comprising, an electric clock mechanism to be associated with a parking berth and including indicator means for indicating a time interval; means actuable by the parking of a vehicle in said berth arranged and constructed so that it is operable to start said clock mechanism when a vehicle parks in said berth and to stop said clock mechanism following the departure of a vehicle from said berth; electrical conducting means between said clock mechanism and said vehicle-actuable means for maintaining said clock mechanism in operation during the interval that a vehicle remains parked in said parking berth; a primary signal means and a secondary signal means operatively connected with said clock mechanism, said vehicle-actuable means being operable to simultaneously operate said primary signal means with the starting of said clock mechanism to indicate that a vehicle has been parked in said berth; a switch mechanism actuable by said clock mechanism at the end of a predetermined period for actuating said secondary signal means to indicate that a vehicle has remained parked in said parking berth for a period longer than said predetermined period; and automatic means for resetting said indicator means to a predetermined starting point upon stopping of said clock mechanism.

9. A system for indicating and timing the parking of vehicles comprising: a parking district, said parking district being sub-divided into a plurality of parking berths; a designating character distinguishing each of said parking berths; an electrically operated clock mechanism for each of said parking berths including indicator means for indicating a time interval, said clock mechanisms being arranged in a group and bearing designating characters corresponding to the designating characters of said parking berths, respectively; a vehicle-actuable means operatively disposed relatively to each of said parking berths for starting said clock mechanisms as vehicles are parked in corresponding berths, and for stopping said clock mechanisms on departure of said vehicles from said parking berths; an electrical circuit connecting each of said vehicle-actuable means with a clock mechanism, whereby any given clock mechanism is maintained in operation during the interval that a vehicle remains parked in its corresponding parking berth; and signal means connected with said clock mechanisms, respectively, and actuable at the termination of a predetermined interval of time to indicate that a vehicle has been parked in a parking berth longer than said predetermined interval.

10. A system for indicating and timing the parking of vehicles, as set out in claim 9, including means connected with each of said clock mechanisms, respectively, for automatically resetting the indicator means of any given clock mechanism to a predetermined starting position upon stopping of said clock mechanism.

11. A system for indicating and timing the parking of vehicles comprising: a parking district, said parking district being sub-divided into a plurality of parking berths; a designating character distinguishing each of said parking berths; and electrically operated clock mechanism for each of said parking berths including indicator means and a graduated scale for indicating time intervals, said clock mechanisms being arranged in a group and bearing designating characters corresponding to the designating characters of said parking berths, respectively; a vehicle-actuable switch operatively disposed relatively to each of said parking berths for starting said clock mechanisms as vehicles are parked in corresponding parking berths and for stopping said clock mechanisms following the departure of said vehicles from said parking berths; wiring connections connecting each of said vehicle-actuable switches with a clock mechanism, whereby any given clock mechanism is maintained in operation during the interval that a vehicle remains parked in its corresponding parking berth; and signal means operatively connected with each of said clock mechanisms and independently actuable by said clock mechanisms at the end of a predetermined period of time, whereby any given clock mechanism may actuate its associated signal means to indicate that a vehicle has remained parked in its corresponding parking berth for a period of time in excess of said predetermined period.

12. A system for indicating and timing the parking of vehicles, as set out in claim 11, in which said clock mechanisms, respectively, are provided with automatic means for resetting the indicator means thereof to a predetermined starting position upon stopping of said clock mechanisms.

13. A system for indicating and timing the parking of vehicles comprising: a parking district, said parking district being sub-divided into a plurality of parking berths; a designating character distinguishing each of said parking berths; an electrically operated clock mechanism for each of said parking berths including indicator means for indicating a time interval, said clock mechanisms being arranged in a group and bearing designating characters corresponding to the designating characters of said parking berths, respectively; a vehicle-actuable switch operatively disposed relatively to each of said parking berths for starting said clock mechanisms as vehicles are parked in corresponding parking berths and for stopping said clock mechanisms after departure of said vehicles from said parking berths; an electrical circuit connecting each of said vehicle actuable switches with a clock mechanism whereby any given clock mechanism is maintained in operation during the interval that a vehicle remains parked in its corresponding parking berth, primary signal means and secondary signal means operatively connected with each of said clock mechanisms, said primary signal means being actuable simultaneously with the starting of said clock mechanisms to indicate that a vehicle has been parked in a parking berth corresponding to a given clock mechanism; and means actuable by said clock mechanisms at the end of a predetermined period of time for actuating said secondary signal means, whereby any given clock mechanism may actuate its associated secondary signal means to indicate that a vehicle has remained parked in its corresponding parking berth for a period of time in excess of said predetermined period.

14. A system for indicating and timing the parking of vehicles, as set out in claim 13, in which said clock mechanisms, respectively, are provided with automatic means for resetting the indicator means of said clock mechanisms to a predetermined starting position upon stopping of said clock mechanisms.

15. Means for indicating and controlling the parking of a vehicle comprising: a parking berth; a designating character identifying said parking berth; a vehicle-actuable switch in said parking berth; an electrically operated clock mechanism for timing the period of parking of a vehicle in said parking berth; a designating character on said clock mechanism corresponding with the designating character of said parking berth; an electrical circuit including said vehicle-actuable switch for actuating said clock mechanism and starting the same when a vehicle parks in said parking berth and for actuating said switch for stopping said clock mechanism when a vehicle departs from said parking berth; indicator means forming a part of said clock mechanism for progressively indicating the passage of time, said indicator means including a graduated dial and a hand; clutch means connected with said clock mechanism for setting said hand in motion relatively to said dial upon actuation of said vehicle-actuable switch; means for returning said hand to a predetermined starting position upon actuation of said vehicle actuable switch by the departure of a vehicle from said parking berth; and signal means operable by said clock mechanism for producing a visual signal when said hand on said clock mechanism attains a predetermined position.

16. Means for indicating the period of parking of a vehicle in a parking berth comprising, an electric clock mechanism to be associated with a parking berth and including indicator means for indicating a time interval; means actuable by the parking of a vehicle in said berth arranged and constructed so that it is operable to start said clock mechanism when a vehicle parks in said berth and to stop said clock mechanism following the departure of a vehicle from said berth; electrical conductor means between said clock mechanism and said vehicle-actuable means for maintaining said clock mechanism in operation during the interval that a vehicle remains parked in said parking berth; a primary signal means and a secondary signal means operatively connected with said clock mechanism, said vehicle-actuable means being operable to simultaneously operate said primary signal means with the starting of said clock mechanism to indicate that a vehicle has been parked in said berth; and a switch mechanism actuable by said clock mechanism at the end of a predetermined period for actuating said secondary signal means to indicate that a vehicle has remained parked in said parking berth for a period longer than said predetermined period.

17. Means for indicating the period of parking of a vehicle in a parking berth comprising: an electrically operated clock mechanism including means for indicating a time interval; means to be associated with a parking berth and actuable by the parking of a vehicle in said berth arranged and constructed so that it is operable to place said time indicating means in operation when a vehicle parks in said berth and to stop said time indicating means on departure of a vehicle from said berth; means connecting said time indicating means with said vehicle-actuable means for maintaining said time indicating means in operation during the interval that a vehicle remains parked in said berth; and means operatively connected with said clock mechanism and time indicating means for resetting said time indicating means to a predetermined starting position when said vehicle-actuable means is actuated by the departure of a vehicle from said berth.

18. Means for indicating the period of parking of a vehicle in a parking berth comprising: an electrically operated clock mechanism to be associated with a parking berth, said clock mechanism including means for indicating a time interval; means to be disposed in said parking berth and actuable by the parking of a vehicle in said berth arranged and constructed so that it is operable to cause said time indicating means to start measuring a time interval when a vehicle parks in said berth and to stop the measurement of said time interval when a vehicle departs from said berth; electrical conductor means connecting said clock mechanism and time indicating means with said vehicle-actuable means for maintaining said time indicating means in operation during the interval that a vehicle remains parked in said berth; and signal means operatively connected with said clock mechanism and time indicating means to produce a signal at the termination of a predetermined time interval.

19. Means for indicating the period of parking of a vehicle in a parking berth, comprising: a mechanism to be associated with a parking berth, said mechanism including movable indicating means for indicating the length of time that a vehicle has remained parked in said berth; and means operatively connected with said mechanism and at all times actuable by the departure of said vehicle from said berth for causing said indicator means to return to a predetermined starting position.

20. Means for indicating the period of parking of a vehicle in a parking berth, comprising: a mechanism to be associated with a parking berth, said mechanism including a pointer and a graduated scale for visibly giving an indication of the length of time that a vehicle has remained parked in said berth; an means operatively connected with said mechanism and actuable at all times by the departure of said vehicle from said berth for causing said pointer to return to a predetermined starting position.

21. Means for indicating the period of parking of a vehicle in a parking berth, comprising: a mechanism to be associated with a parking berth, said mechanism including a movable timing element and a graduated scale for visibly indicating a time interval; and means including a switch to be disposed in said parking berth and actuable by the parking of a vehicle in said berth operatively connected with said mechanism and arranged and constructed so as to cause said movable timing element to start measuring a time interval upon the parking of a vehicle in said berth and to continue such measuring during the entire interval that a vehicle remains parked in said berth.

22. Means for indicating the period of parking of a vehicle in a parking berth, comprising: a mechanism to be associated with a parking berth, said mechanism including a movable timing element and a graduated scale for visibly indicating a time interval; means to be disposed in said parking berth and actuable by the parking of a vehicle in said berth operatively connected with said mechanism and arranged and constructed so as to cause said movable timing element to start measuring a time interval upon the parking of a vehicle in said berth and to permit said timing element to return to starting position upon departure of a vehicle from said berth; and means associated with said mechanism for producing a signal at the termination of a predetermined time interval.

23. Means for indicating the period of parking of a vehicle in a parking berth, comprising: a timing mechanism including a scale provided with suitable graduations for giving an indication of a time interval; a movable indicator normally disengaged from said timing mechanism arranged to traverse said scale; coupling means for operatively connecting said movable indicator with said timing mechanism; and means to be associated with the parking berth and actuable by the parking of a vehicle in said berth arranged and constructed so that it causes said coupling means to become effective for drivingly connecting said movable indicator with said timing mechanism to start measuring a time interval when a vehicle parks in said berth and to automatically release said coupling means when a vehicle departs from said berth.

ERNEST J. SWEETLAND.